(12) United States Patent
Mehrtens et al.

(10) Patent No.: US 7,374,300 B2
(45) Date of Patent: *May 20, 2008

(54) METAL REFLECTOR AND PROCESS FOR PRODUCING IT

(75) Inventors: Andree Mehrtens, Gruenenplan (DE); Thomas Kuepper, Bad Gandersheim (DE); Lutz Zogg, Bad Gandersheim (DE)

(73) Assignee: Schott AG, Mainz (DE)

( * ) Notice: Subject to any disclaimer, the term of this patent is extended or adjusted under 35 U.S.C. 154(b) by 90 days.

This patent is subject to a terminal disclaimer.

(21) Appl. No.: 11/245,699

(22) Filed: Oct. 7, 2005

(65) Prior Publication Data

US 2006/0139744 A1 Jun. 29, 2006

(30) Foreign Application Priority Data

Oct. 7, 2004 (DE) ............ 10 2004 049 134
Jun. 17, 2005 (DE) ............ 10 2005 028 456

(51) Int. Cl.
*G02B 5/08* (2006.01)
*G02B 7/195* (2006.01)

(52) U.S. Cl. ............... 359/845; 359/360; 362/296
(58) Field of Classification Search ........... 359/360, 359/845; 362/296
See application file for complete search history.

(56) References Cited

U.S. PATENT DOCUMENTS

| | | | | |
|---|---|---|---|---|
| 3,361,903 A * | 1/1968 | Brown | .............. | 362/294 |
| 3,944,320 A | 3/1976 | McLintic | .............. | 350/1 |
| 4,337,097 A * | 6/1982 | Tokumasu et al. | .......... | 148/253 |
| 5,433,988 A * | 7/1995 | Fukuda et al. | .............. | 428/141 |
| 5,947,590 A * | 9/1999 | Meuse et al. | .............. | 362/264 |
| 2002/0153486 A1* | 10/2002 | Ishizuya et al. | ......... | 250/338.1 |
| 2003/0058656 A1* | 3/2003 | Yamaguchi | .............. | 362/547 |
| 2004/0233530 A1* | 11/2004 | Kramer et al. | .............. | 359/507 |
| 2004/0264197 A1* | 12/2004 | Bewig et al. | .............. | 362/294 |
| 2005/0128403 A1* | 6/2005 | Liu | .............. | 349/141 |

FOREIGN PATENT DOCUMENTS

| | | |
|---|---|---|
| DE | 10029905 A1 | 1/2002 |
| DE | 69708869 T2 | 1/2002 |
| DE | 69430721 T2 | 9/2002 |
| WO | WO2004/026785 | 4/2004 |

* cited by examiner

*Primary Examiner*—Joshua L Pritchett
(74) *Attorney, Agent, or Firm*—Ohlandt, Greeley, Ruggiero & Perle L.L.P.

(57) ABSTRACT

The invention provides a process for producing a high-precision reflector and its coating. A reflector is produced from a solid material using a material-removing process and is coated with a cold-light mirror layer.

13 Claims, 17 Drawing Sheets

METAL REFLECTOR AND PROCESS FOR PRODUCING IT

CROSS-REFERENCES TO RELATED APPLICATIONS

The present application is claiming priority of German Patent Application No. 10 2004 049134.8-54, filed on Oct. 7, 2004 and German Patent Application No. 10 2005 028 456.6, filed on Jun. 17, 2005 the content of which is herein incorporated by reference.

BACKGROUND OF THE INVENTION

1. Field of the Invention

The invention relates to a process for producing a high-precision metal reflector and to a metal reflector. A projection system also forms the subject matter of the invention.

2. Description of Related Art

In practice, reflectors have a wide range of applications; mention may be made in particular of headlamp reflectors, in particular in the automotive industry, and of reflectors as used for projection systems, for example digital projectors.

DE 100 29 905 describes a reflector for a motor vehicle, in which a cold-light coating has been applied by means of a deposition process. The reflector has a base body made from plastic.

Plastic reflectors of this type have the drawback of not being particularly heat-resistant. In particular if the reflector is provided with what is known as a cold-light mirror coating, i.e. a layer which transmits and partially absorbs infrared radiation, high thermal stresses are produced in particular in the case of high-power projection systems.

Deep-drawn metal reflectors, which are likewise often used in practice, often do not have the required accuracy. Furthermore, these reflectors are relatively thin. On account of this small volume of material, it is difficult to sufficiently dissipate the heat, in particular in a projection system, and consequently the reflector reaches very high temperatures.

U.S. Pat. No. 3,944,320 discloses a cold-light mirror with an enameled coating. A particular drawback of enameled coatings of this type is that it is impossible to achieve a very high level of accuracy, which has an adverse effect on the optical quality of a projection system. Furthermore, the enamel layer is highly temperature-sensitive, and consequently a mirror of this type cannot be used for high-power projectors.

To achieve good optical properties, reflectors with a base body made from glass are primarily used for high-power projectors. Reflectors of this type are distinguished by a relatively high accuracy. However, one drawback is that glass is a relatively poor conductor of heat, and consequently it is difficult to dissipate the heat in particular in high-power projectors, which leads to high temperatures, in particular at the reflector surface. This applies in particular if the reflector has a cold-light mirror coating, i.e. a layer which preferably transmits infrared radiation and is reflective in at least a partial region of the visible spectrum. Since a certain proportion of the infrared radiation which passes through the glass body is absorbed by the latter, the glass body is considerably heated. Therefore, glass reflectors in high-power projection systems usually have only a limited service life.

BRIEF SUMMARY OF THE INVENTION

By contrast, the invention is based on the object of providing a reflector with good optical properties. A further object of the invention is to provide a reflector which is not sensitive to high temperatures and allows good dissipation of heat which is generated. Another object of the invention is to provide a combination of metal reflector and cold-light mirror coating which has a good optical quality and can be produced with a high level of accuracy. A further object of the invention is to provide a projection system with good optical properties and a high dissipation of heat. It is also intended to allow the production of a high-power projection system with a reflector which is easy to replace.

The object of the invention is achieved by a process for producing a high-precision reflector, by a reflector having a reflecting inner side and an outer side, and by a process for coating a metal reflector and by a projection system.

According to the invention, there is provision for the production of a high-precision reflector by first of all providing a solid body made from metal and then producing the reflector geometry by a material-removing machining process. It is thus possible to produce thick-walled metal reflectors with a high degree of accuracy. By contrast, deep-drawn metal reflectors consist of thin material. In this case, the geometry produced by the deep-drawing operation cannot be anything like as accurate as that which is achieved when using a material-removing machining process.

The body of solid material provided may have any desired geometry; for example it is conceivable for the reflector to be produced from a cuboidal steel block or from a round material. However, it is also conceivable to provide a semi-finished product in a form which already basically corresponds to the geometry of a reflector, so that less material needs to be removed.

Surprisingly, it has emerged that the metal reflectors produced in this way have a similar accuracy to glass reflectors, can have similarly good optical properties and, moreover, are much less expensive to produce than corresponding high-precision glass reflectors.

Moreover, material-removing machining processes can be used to produce any desired reflector geometries, encompassing not just parabolic or elliptical forms, but also any desired faceted forms.

Moreover, the metal reflectors produced in accordance with the invention are distinguished by a high thermal stability and in particular by the fact that the heat can be dissipated particularly successfully, since thick-walled reflector geometries are possible.

In a preferred embodiment of the process, a chip-forming process is carried out; in particular, reflector geometry is turned or milled. Processes of this type are familiar from practical applications and can be carried out very accurately, for example using diamond-tipped tools.

In particular if more complicated geometries are to be produced, it is recommended for at least parts of the reflector geometry to be produced by an electrical discharge machining process. In particular narrow channels can often only be realized using machining processes of this type.

It is preferable for the reflector surface, i.e. the reflective surface on the front side of the reflector, to be surface-treated, in particular lapped, ground or polished, in order to produce a low roughness and high dimensional accuracy.

In a preferred embodiment of the process, a parabolic or elliptical reflector geometry is produced, but any other desired geometries, such as a faceted geometry, are also conceivable.

In a refinement of the invention, a structure is produced on the rear side of the reflector, i.e. the side which is remote from the reflective side, likewise by means of a material-removing process.

In particular, the process according to the invention makes it possible to provide the rear side with a screw thread, with cooling ribs or with locating or centering means. It is thus possible to provide a single-piece reflector which has functional elements, such as centering pins, screw threads, etc., on the rear side.

In this context, it is advantageous in particular for the reflector base body to substantially comprise a metal, in particular stainless steel, aluminum, copper or silver. Unlike glass, these materials are not prone to brittle fracture, and consequently even complicated geometries or cooling passages are possible. Metals with a high thermal conductivity, such as certain steel alloys, aluminum copper or silver, are particularly preferred.

In a refinement of the invention, the reflector is coated on the front side with a reflection layer, in particular with a layer comprising aluminum and silver. Layers of this type, which increase the reflectivity of a surface, are generally known.

In particular, there is also provision for the metallic reflector to be coated with a suitable cold-light mirror layer. These are coatings known to the person skilled in the art which absorb infrared light and reflect the visible light in at least a partial region of the visible spectrum, making the metallic reflector into a cold-light mirror. A particular benefit of the reflector according to the invention is that it allows a high dissipation of heat, since a coating of this type leads to greatly increased thermal stresses on the reflector.

In particular, there is provision for an optical functional layer, which according to the present application also includes the cold-light mirror layer, to be applied by means of a PVD (Physical Vapor Deposition) or CVD (Chemical Vapor Deposition) process. Layers applied in this way are distinguished by a high dimensional accuracy, are securely bonded to the substrate and can be applied in thin film thicknesses.

In particular, it is advantageous if at least two layers are applied in one installation, for example a vacuum installation. In this context, consideration has been given in particular to applying a reflection layer first and then a cold-light mirror layer. Furthermore, it is also recommended for the reflector to be provided with a transparent scratchproof layer or a self-cleaning layer. If the layers are applied in one installation, as is preferred, the entire coating operation can be carried out in one go.

The invention also relates to a reflector having a reflecting inner side and an outer side, which reflector includes a metal substrate and at least one coating deposited by means of a PVD or CVD process.

The inventors have discovered that PVD and CVD processes which have previously been developed for the coating of plastic or glass, if suitable process parameters are appropriately adapted, are fundamentally also suitable for the coating of metal reflectors. In particular, a metal reflector of this type with a deposited coating, in particular a reflection coating, allows similarly good optical properties to those of a glass reflector to be achieved but with a significantly improved dissipation of heat and a longer service life.

To improve the dissipation of heat, there is provision for cooling ribs to be arranged on the reflector outer side. As an alternative or in addition to this, the reflector may also have cooling passages for connection to an external cooling circuit. It is thus possible to directly cool the reflector and dissipate the heat via an external cooler. In particular, there is provision for there to be at least one flange for connection to an external coolant circuit. In this context, it is important for the reflector base body to substantially comprise metal. It is very difficult to form accurate screw threads and cooling passages in glass.

In a refinement of the invention, the reflector includes a cavity which is at least partially filled with a coolant. A coolant can circulate within this cavity, in which, by way of example, cooling ribs may also be present, and can thus cool the reflector by convection alone. It is thus even conceivable to provide reflectors which make do without forced circulation of air even for high-power projectors. Even fan-operated forced circulation of air in high-power projection systems has the drawback of being relatively loud.

This is extremely disadvantageous in particular for beamers for film projection.

In a refinement of the invention, a coolant which undergoes a phase transition at approximately operating temperature is introduced. By way of example, it is conceivable for the cavity of the reflector to be only partially filled with a coolant of this type, which makes a higher cooling capacity possible through condensation and transition to the gaseous state.

In a refinement of the invention, the reflector has locating means at least on its rear side. The term locating means is to be understood as meaning any device known to the person skilled in the art which allows the reflector to be fitted in a defined way in a corresponding holder. The locating means used may be pins, a tongue-and-groove system or alternatively a cone, as well as other means familiar to the person skilled in the art. Another benefit of the reflector according to the invention is that locating means of this type can be arranged on or introduced into a metal substrate with a high level of accuracy and then allow the reflector to be fitted in an accurately defined position. It is thus possible to provide a projection system in which the reflector is easy to replace and does not have to be adjusted after it has been replaced.

In particular if this is a reflector for a projector, it is advantageous if the reflector has a coating which preferably absorbs infrared radiation on the inner side, i.e. is configured as a cold-light mirror.

An infrared-absorbing layer of this type may, for example, comprise a black layer which absorbs not only in the infrared but also in the visible spectral region. These can be applied, for example, by vapor deposition. Inter alia, TiCN, WCH and AlTiN layers have proven suitable for this purpose. In particular absorbing enamel layers have a good ability to withstand thermal stresses. Another option is for a black layer to be produced by electroplating or by chemical reaction with the substrate material. In this way, an absorbing anodized layer is produced. Finally, it is also possible to apply black chrome and/or black nickel layers, to which end deposition by electroplating is likewise suitable. Layers of this type have very good absorption properties over a wide wavelength range.

To achieve good cold-light properties in combination with an interference layer system applied to the black layer, according to a refinement of the invention, a black layer arranged at least on the inner side of the reflector has an absorption of at least 80% in the visible and in particular also the infrared region up to a wavelength of 1800 nanometers, and preferably has an absorption of at least 75% up to a wavelength of 2400 nanometers.

The reflecting inner side of the reflector advantageously has a roughness average $R_a$ of less than 200 nm, preferably of less than 50 nm and particularly preferably of less than 20 nm. Such smooth structures are distinguished by a high reflectance.

In a preferred embodiment of the reflector, the tolerance zone width at least on the inner side is less than 200 µm, preferably less than 50 µm and particularly preferably less than 10 µm. With a metal reflector, it is possible to provide a high-precision component which has only extremely minor deviations from the desired dimension.

In a preferred embodiment of the reflector, at least on the reflecting inner side it has a material thickness of over 0.3 mm, preferably over 0.8 mm and particularly preferably over 1.5 mm. There is therefore provision for at least the reflector shell to form a relatively thick-walled metal structure which allows particularly good dissipation of heat.

This is not possible when using deep-drawn metal reflectors, since deep-drawing processes are suitable only for thin-walled metal sheets.

In a preferred embodiment, the reflector is in the form of a single piece. In the context of the invention, reflector is to be understood as meaning the entire component which, as likewise described as the subject of the invention, includes cooling passages, cooling ribs or the like.

In a refinement of the invention, the reflector at least on the rear side has indentations with a cross section substantially in the shape of craters. Indentations of this type, which are also known as dimples, have the particularly advantageous effect whereby when a fluid is flowing past the reflector, turbulence or tornado-like structures are formed, which can considerably improve the dissipation of heat.

The subject of the invention is also a process for coating a metal reflector. This process involves providing a reflector substrate comprising metal and depositing a functional layer, in particular an absorption layer and/or a reflection layer, on the surface of the reflector substrate. The term absorption layer is to be understood as meaning a layer which has absorbing properties at least in a partial region of the wavelength spectrum. The reflection layer has reflecting properties at least in a partial region of the visible wavelength spectrum. Layers can be produced with a very high accuracy by means of a deposition process, in particular a chemical or physical deposition process.

There is provision for the reflector substrate used to be either a substrate produced from a solid material by means of a material-removing machining process or a deep-drawn metal base body.

In particular, it is intended to provide a cold-light metal reflector which has a cold-light mirror coating applied by means of a deposition process.

Layers of this type can be achieved in particular by depositing a metal layer and then oxidizing and depositing oxide and nitride layers.

In particular, there is provision for a reflection layer, in particular an aluminum or silver layer for increasing the reflectance of the surface of the metallic reflector, to be deposited first of all, since many metallic materials, in particular tool steels, inherently have only a relatively low degree of reflection in the visible region.

There is then provision for a transparent alternating layer made of sublayers with a high and low refractive index, such as for example silicon oxide and titanium oxide, to be applied as the cold-light mirror layer. In the context of the present application, the term transparent is to be understood as meaning a layer which has transparent properties at least in a partial region of the visible wavelength spectrum. In particular, at least one chromium oxide layer for partial absorption of the infrared radiation is also provided in the alternating layer system.

Advantageous deposition processes with which the person skilled in the art will be familiar include PVD processes, such as sputtering and evaporation coating processes, as well as electron beam physical vapor deposition, or CVD processes, in particular plasma-enhanced CVD processes.

In a refinement of the process, in particular in the case of a deep-drawn metal reflector, there is provision for cooling ribs to be welded, soldered or adhesively bonded to the rear side. In particular in the case of thin-walled deep-drawn metal reflectors, the dissipation of heat is often inadequate. Therefore, according to the invention there is provision for cooling ribs to be soldered to the rear side of the reflector.

In one particular embodiment, there is provision for fins to be arranged parallel to the reflector axis. The term fins is to be understood as meaning metal sheets which taper to a point substantially toward the rear.

In a refinement of the invention, the fins are simultaneously provided with centering means, in particular locating pins are fitted to the end of the fins, by means of which locating pins the reflector can be fitted accurately into a corresponding holder.

A further subject of the invention is a projection system, comprising a metal reflector and a holder for the metal reflector, with locating means being provided between reflector and holder.

In the context of the application, a metal reflector is to be understood as meaning a reflector which substantially includes metal, i.e. in particular a reflector according to the invention with a metal substrate. By means of the locating means, which are in particular locating pins, a tongue-and-groove system or a cone, it is possible to anchor the reflector accurately in a holder. It is thus possible to provide a projection system with reflector and holder, which makes it possible to replace the reflector without then having to adjust it. It is advantageous in particular to use a reflector produced from a solid material, in which the locating means may form part of the rear side structure. In this context, it is of benefit to the projection system that a metal reflector of this type can be produced with a high dimensional accuracy, and mechanical functional elements such as pins and screws can particularly successfully be formed from a solid metal material.

In a refinement of the invention, a thermally conductive paste is arranged between the reflector and holder of the projection system. This further improves the dissipation of heat from the reflector to the holder.

In a refinement of the invention, the reflector and holder can be connected to one another by means of a latchable system, in particular by means of a bayonet closure. In particular, it is provided that the reflector can be latched in the holder and is thus easy to fit and remove.

According to the invention, the cooling of the reflector, which in particular has a cold-light mirror coating, can also be effected by way of the holder. There is also provision for a coolant to be passed between the reflector and holder. This coolant may be any desired fluid, i.e. including air. If the heat is also to be dissipated via the holder, it is expedient for a material with a good thermal conductivity, in particular a metal, likewise to be used for the holder. It is also possible for cooling ribs to be arranged on the holder. It is thus possible to provide a projection system in which there is no need to use any motor-driven fans. The heat can be dissipated by radiation and convection alone.

It is advantageous for a transparent plate or lens to be situated in front of the reflector, to provide protection or to achieve further optical functions.

A refinement of the invention uses a plate which preferably reflects light in the infrared region, thereby preventing thermal radiation from penetrating to the outside. A design of this type is made possible in particular by the property of a metal reflector according to the invention of rapidly dissipating heat.

BRIEF DESCRIPTION OF THE SEVERAL VIEWS OF THE DRAWINGS

The invention is to be explained in more detail below with reference to the drawings FIG. 1 to FIG. 10, in which.

DETAILED DESCRIPTION OF THE INVENTION

FIGS. 1a to 1f show a diagrammatic sectional view of a reflector 1 according to the invention in various embodiments of the applied coating. The reflector is produced from a metal block by means of a chip-forming process and accordingly has a thick-walled metal substrate 2. The reflector geometry is substantially parabolic. The reflector 1 has a concentric cutout 9, through which a luminous means can be introduced.

Figure 1A:
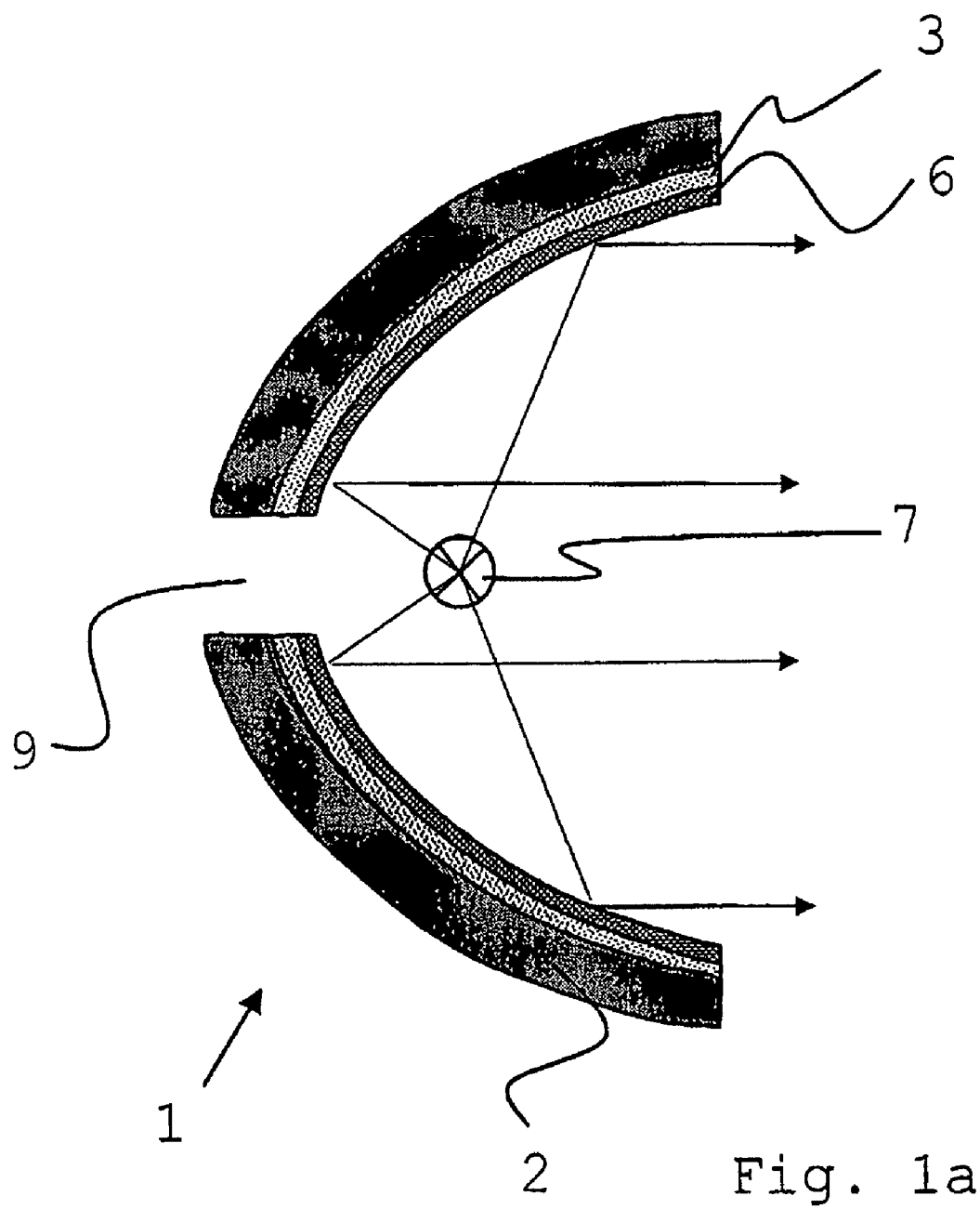
FIG. 1a shows a diagrammatic sectional view of a reflector according to the invention with a reflecting aluminum or silver layer and a protective layer, e.g. of $SiO_2$, on top of it.

According to the exemplary embodiment shown in FIG. 1a, the metal substrate 2 is provided with a silver or aluminum reflection layer 3 and a protective layer 6 in the form of a single layer, for example of $SiO_2$. A light source 7 is diagrammatically indicated in the center of the reflector.

Figure 1B:
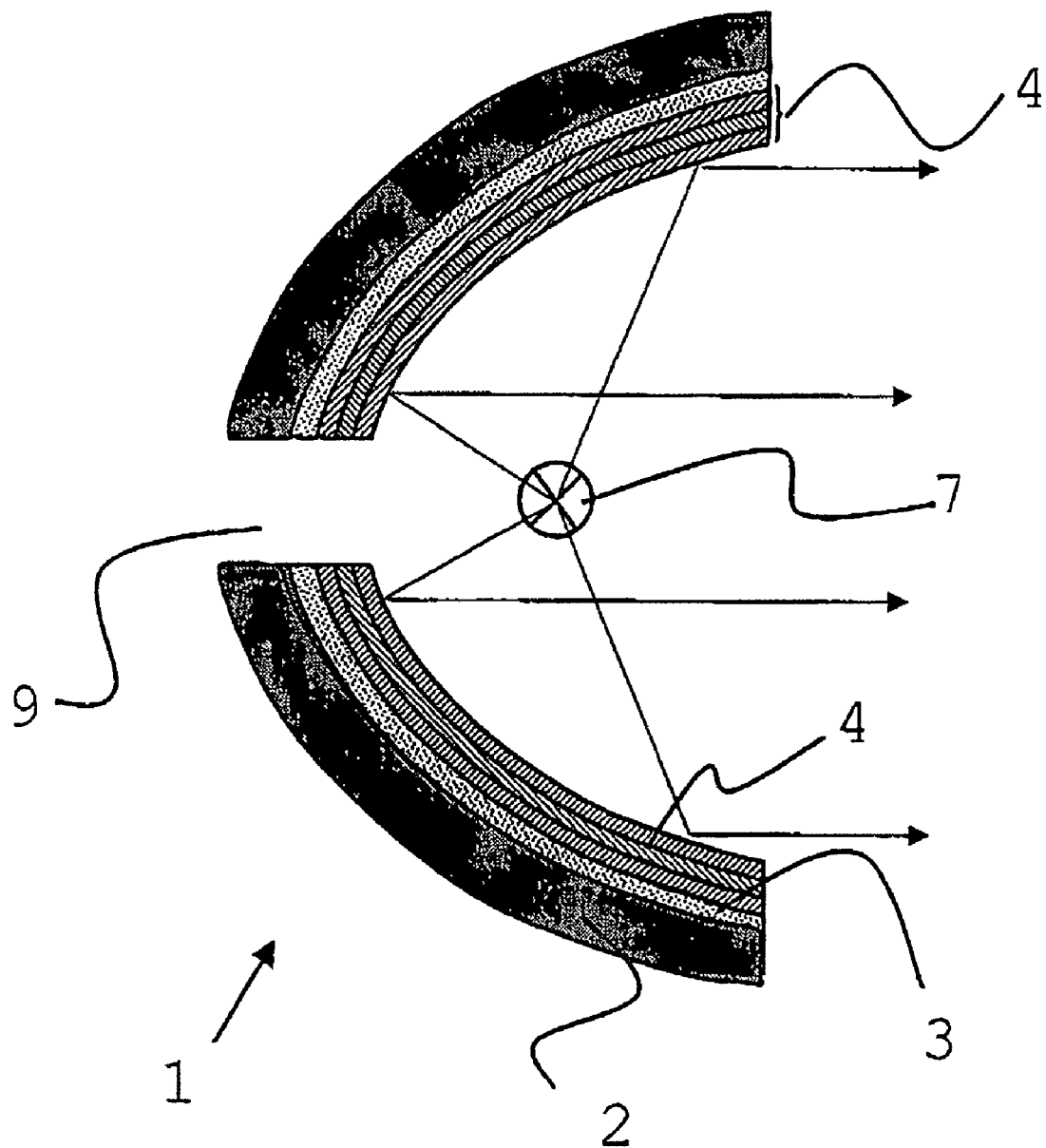
FIG. 1b shows a diagrammatic sectional view of a reflector according to the invention with a reflecting aluminum or silver layer and an alternating layer system of $SiO_2$ and $TiO_2$ layers on top of it for increasing the reflection in the visible region of the spectrum.

In accordance with the exemplary embodiment shown in FIG. 1b, the metal substrate 2 is provided with a silver or aluminum reflection layer 3 and with an alternating layer 4. In this exemplary embodiment, the alternating layer 4 comprises a total of three titanium oxide and silicon oxide layers, applied alternately by sputtering. The applied alternating layers in this exemplary embodiment have the function of increasing the reflection of at least some of the visible light compared to the reflection of the uncoated metal surface of the reflector 1. A light source 7 is diagrammatically indicated in the center of the reflector.

Figure 1C:
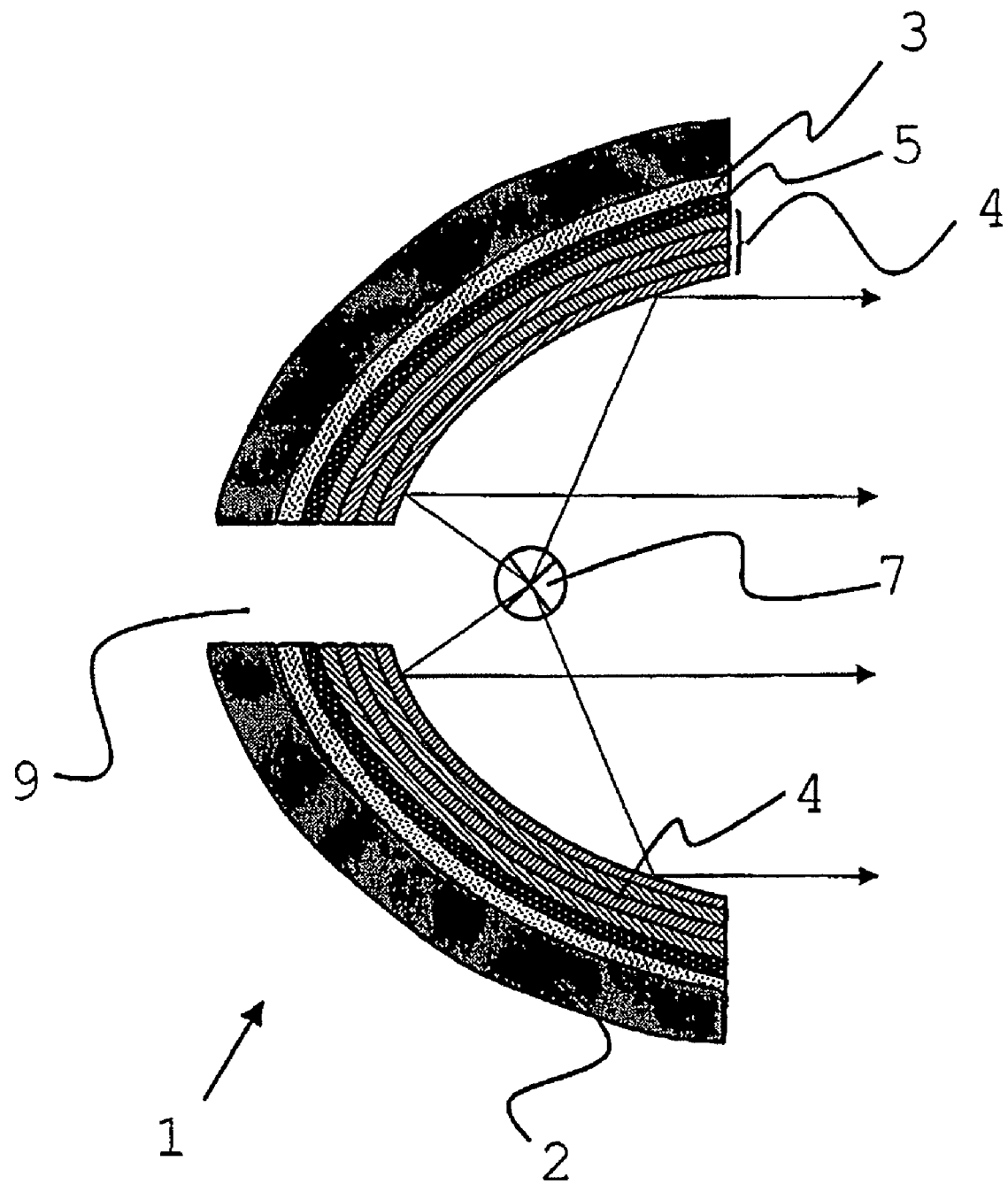
FIG. 1c shows a diagrammatic sectional view of a reflector according to the invention with a reflecting aluminum or silver layer and a cold-light mirror coating on top of it, comprising a chromium oxide layer and an alternating layer system made up of $SiO_2$ and $TiO_2$ layers on top of it.

In accordance with the exemplary embodiment shown in FIG. 1c, the metal substrate 2 is provided with a silver or aluminum reflection layer 3 and a partially absorbing chromium oxide layer 5 and an alternating layer 4. In this exemplary embodiment, the alternating layer 4 comprises a total of four titanium oxide and silicon oxide layers applied alternately by sputtering. The function of this exemplary embodiment is that of a cold-light mirror coating on a reflecting metal substrate. A light source 5 is diagrammatically indicated in the center of the reflector.

Figure 1D:
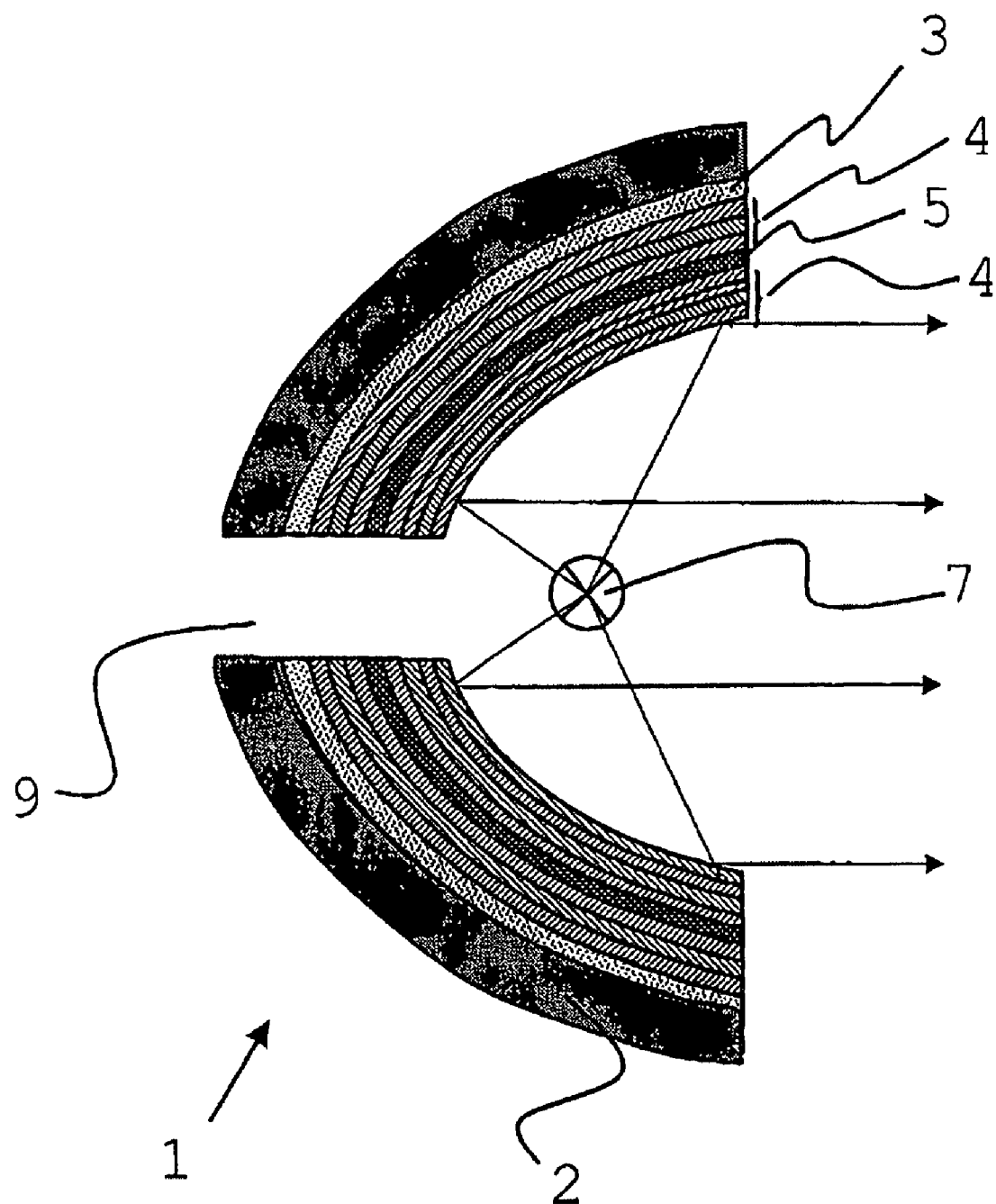
FIG. 1d shows a diagrammatic sectional view of a reflector according to the invention with a reflecting aluminum or silver layer and an alternating layer system made up of $SiO_2$ and $TiO_2$ layers on top of it, for increasing the reflection in the visible region of the spectrum, and a cold-light mirror coating on top of it, comprising a chromium oxide layer and an alternating layer system made of $SiO_2$ and $TiO_2$ layers on top of it.

In accordance with the exemplary embodiment shown in FIG. 1d, the metal substrate 2 is provided with a silver or aluminum reflection layer 3 and an alternating layer 4 on top of it for increasing the reflection of the metallic surface. In this exemplary embodiment, the alternating layer 4 comprises a total of three titanium oxide and silicon oxide layers applied alternately by sputtering. A cold-light mirror coating, comprising a partially absorbing chromium oxide layer 5 and a further alternating layer 4, has been applied to this highly reflecting surface. In the exemplary embodiment, this further alternating layer 4 comprises a total of four titanium oxide and silicon oxide layers applied alternately by sputtering. The function of this exemplary embodiment is that of a cold-light mirror coating on a particularly highly reflecting metal substrate. A light source 7 is diagrammatically indicated in the center of the reflector.

Figure 1E:
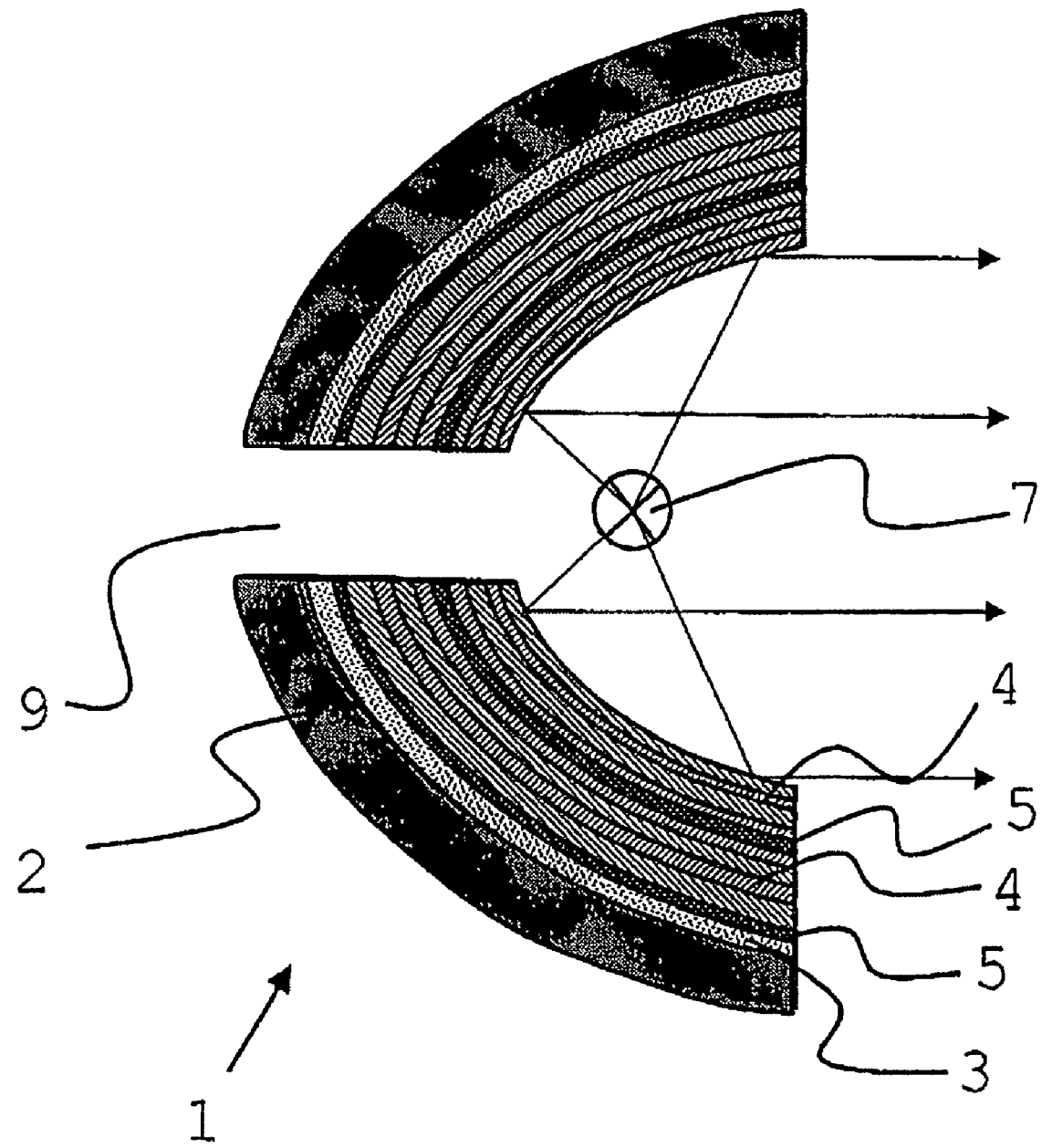
FIG. 1e shows a diagrammatic sectional view of a reflector according to the invention having a reflecting aluminum or silver layer and a two-part cold-light mirror coating on top of it, comprising a chromium oxide layer and an alternating layer system made of $SiO_2$ and $TiO_2$ layers on top of it, as well as a further chromium oxide layer with an alternating layer system made of $SiO_2$ and $TiO_2$ layers on top of it.

In accordance with the exemplary embodiment shown in FIG. 1e, the metal substrate 2 is provided with a silver or aluminum reflection layer 3. A split cold-light mirror coating, comprising in each case a partially absorbing chromium oxide layer 5 and a subsequent alternating layer 4, has been applied to this reflection layer 3. In this exemplary embodiment, the alternating layer 4 comprises a total of four titanium oxide and silicon oxide layers applied alternately by sputtering. The function of this exemplary embodiment is that of a cold-light mirror coating on a reflecting metal substrate with a particularly good cold-light mirror action. A light source 7 is diagrammatically indicated in the center of the reflector.

Figure 1F:
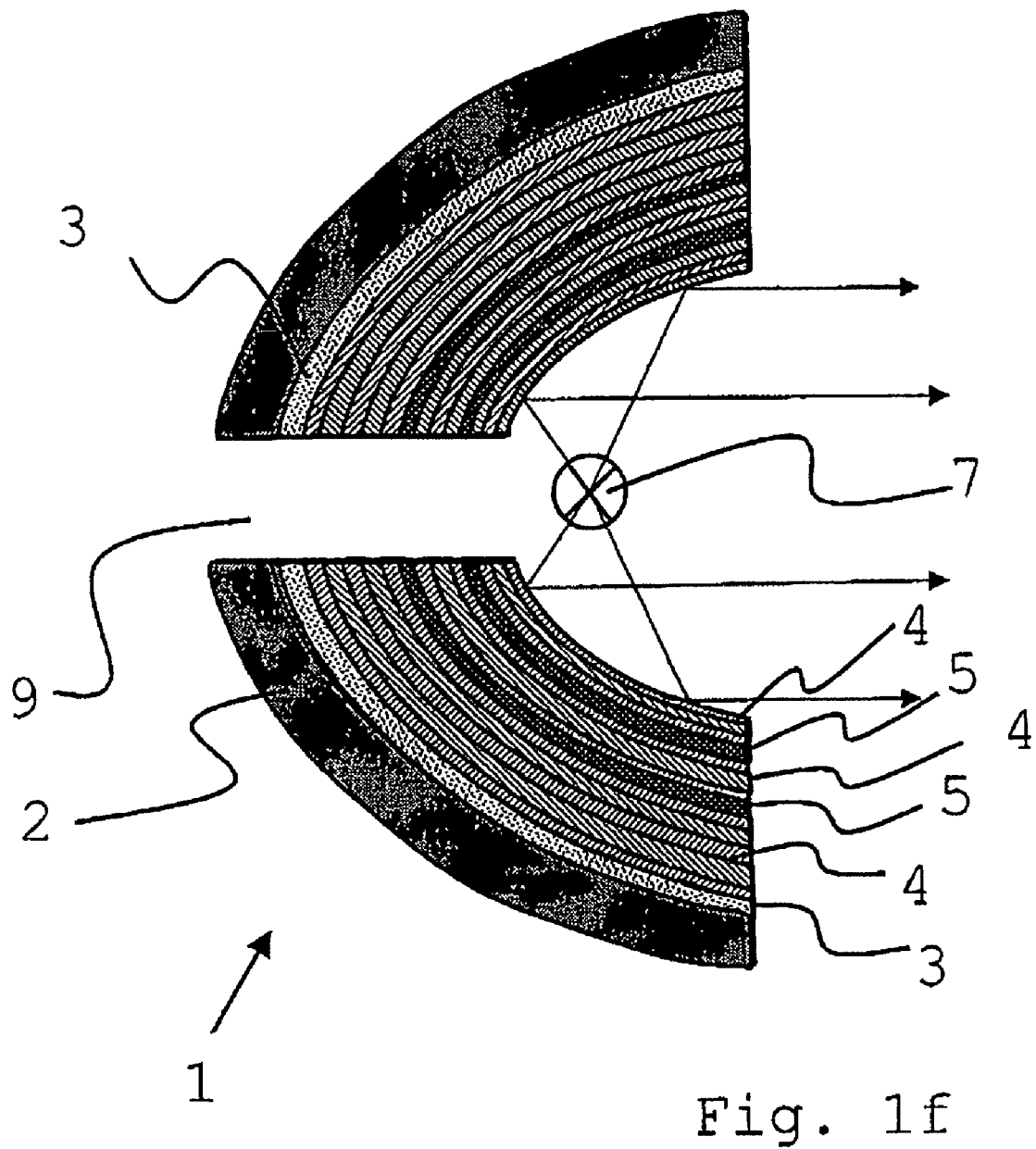
FIG. 1f shows a diagrammatic sectional view of a reflector according to the invention with a reflecting aluminum or silver layer and an alternating layer system on top of it for increasing the reflection in the visible region of the spectrum, as well as a two-part cold-light mirror coating on top of it, comprising a chromium oxide layer and an alternating layer system made up of $SiO_2$ and $TiO_2$ layers on top of it, as well as a further chromium oxide layer with an alternating layer system made up of $SiO_2$ and $TiO_2$ layers on top of it.

In accordance with the exemplary embodiment shown in FIG. 1f, the metal substrate 2 is provided with a silver or aluminum reflection layer 3 and an alternating layer 4 on top of it for increasing the reflection of the metallic surface. In the exemplary embodiment, the alternating layer 3 comprises a total of three titanium oxide and silicon oxide layers applied alternately by sputtering. A split cold-light mirror coating, in each case comprising a partially absorbing chromium oxide layer 5 and a subsequent alternating layer 4, has been applied to this alternating layer 3. In this exemplary embodiment, the alternating layer 4 comprises a total of four titanium oxide and silicon oxide layers applied alternately by sputtering. The function of this exemplary embodiment is that of a cold-light mirror coating on a particularly highly reflecting metal substrate with a particularly good cold-light mirror action. A light source 7 is diagrammatically indicated in the center of the reflector.

Figure 1G:
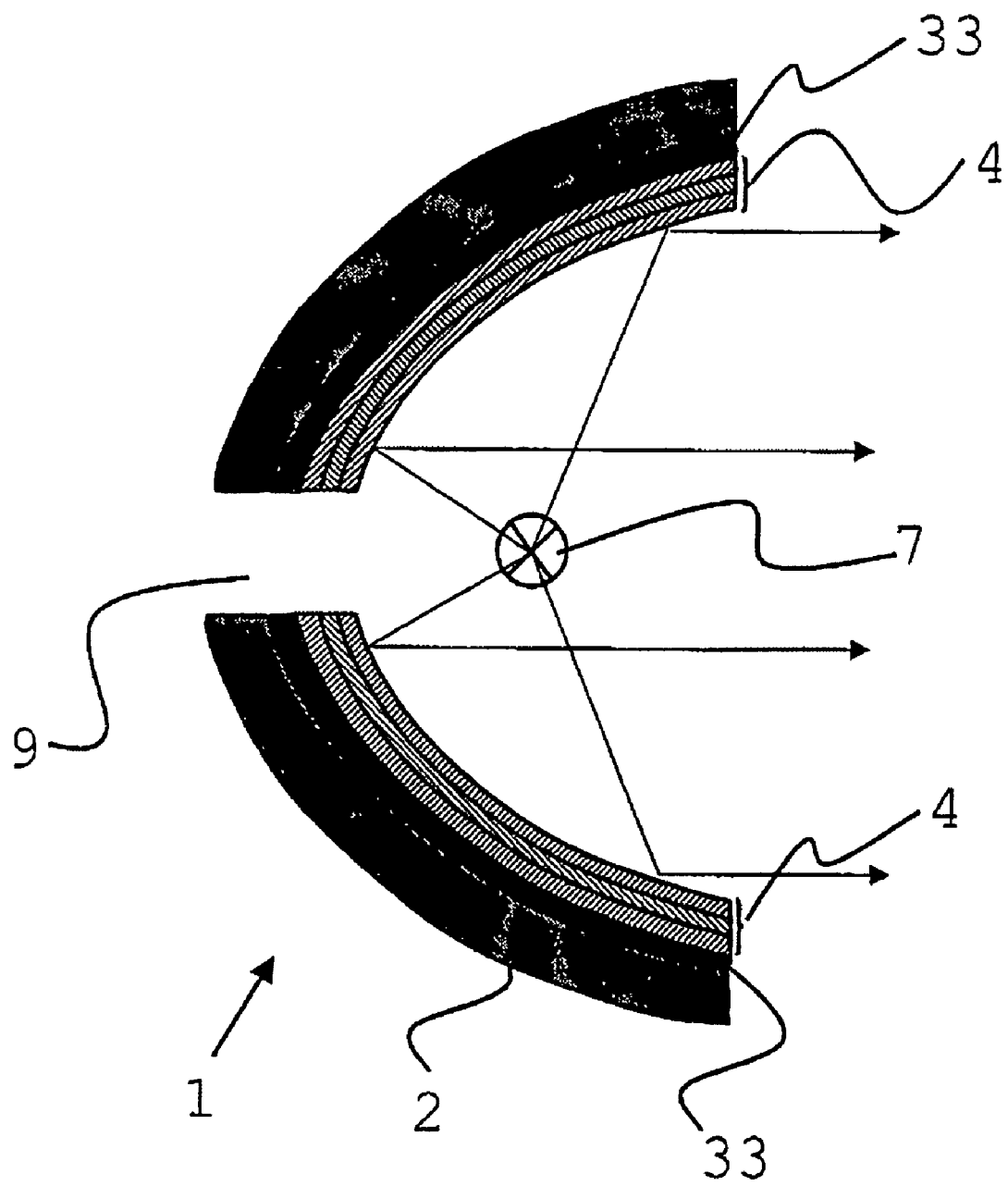
FIG. 1g shows an example of a reflector according to the invention with an absorbing black layer and an alternating layer system on top of it.

FIG. 1g shows a diagrammatic cross-sectional view of a further example of a reflector according to the invention. An absorbing black layer 33 has been applied to the reflector inner side, and an alternating layer system which, like a cold-light reflector, reflects visible light and transmits infrared light, has been applied to the black layer 33. The infrared light is absorbed by the black layer 33 and converted into heat and can be taken up by the reflector body or the metal substrate and if appropriate dissipated using coolant.

The black layer may, for example, comprise a TiCN, WCH or AlTiN layer applied by vapor deposition. With regard to the ability to withstand temperature changes, an absorbing enamel layer has also proven particularly suitable. A layer of this type can likewise be formed by electroplating as an absorbing anodized layer. Black chrome and/or black nickel layers are also suitable.

A black layer according to the invention is particularly suitable if it has an absorption of at least 80% in the visible and in particular also the infrared region up to a wavelength of 1800 nanometers, and preferably has an absorption of at least 75% up to a wavelength of 2400 nanometers.

Figure 2:
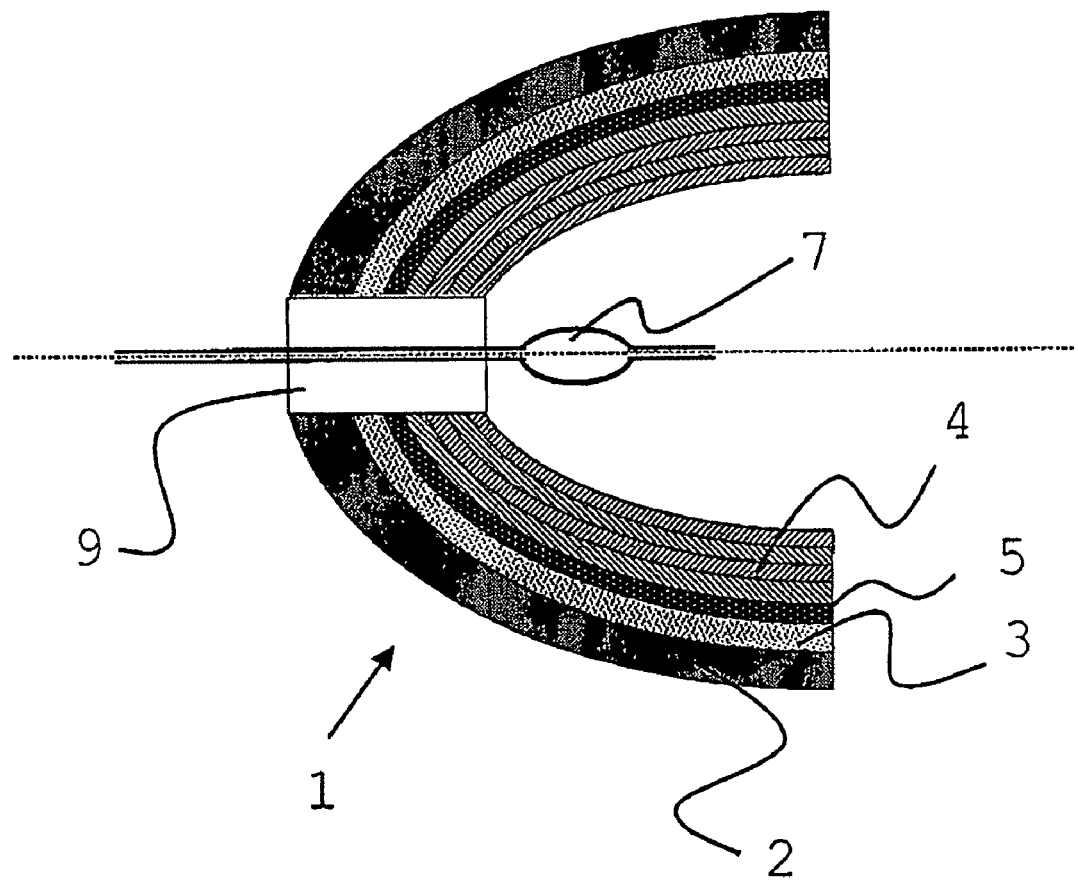
FIG. 2 shows a likewise diagrammatic sectional view of a reflector according to the invention with a high-power lamp.

FIG. 2 likewise shows a diagrammatic sectional view of a reflector 1 with a thick-walled metal substrate 2, a reflection layer 3 and an infrared-absorbing cold-light mirror coating based on the example of the embodiment shown in FIG. 1c. The light source 7 provided is a high-power lamp.

Figure 3:
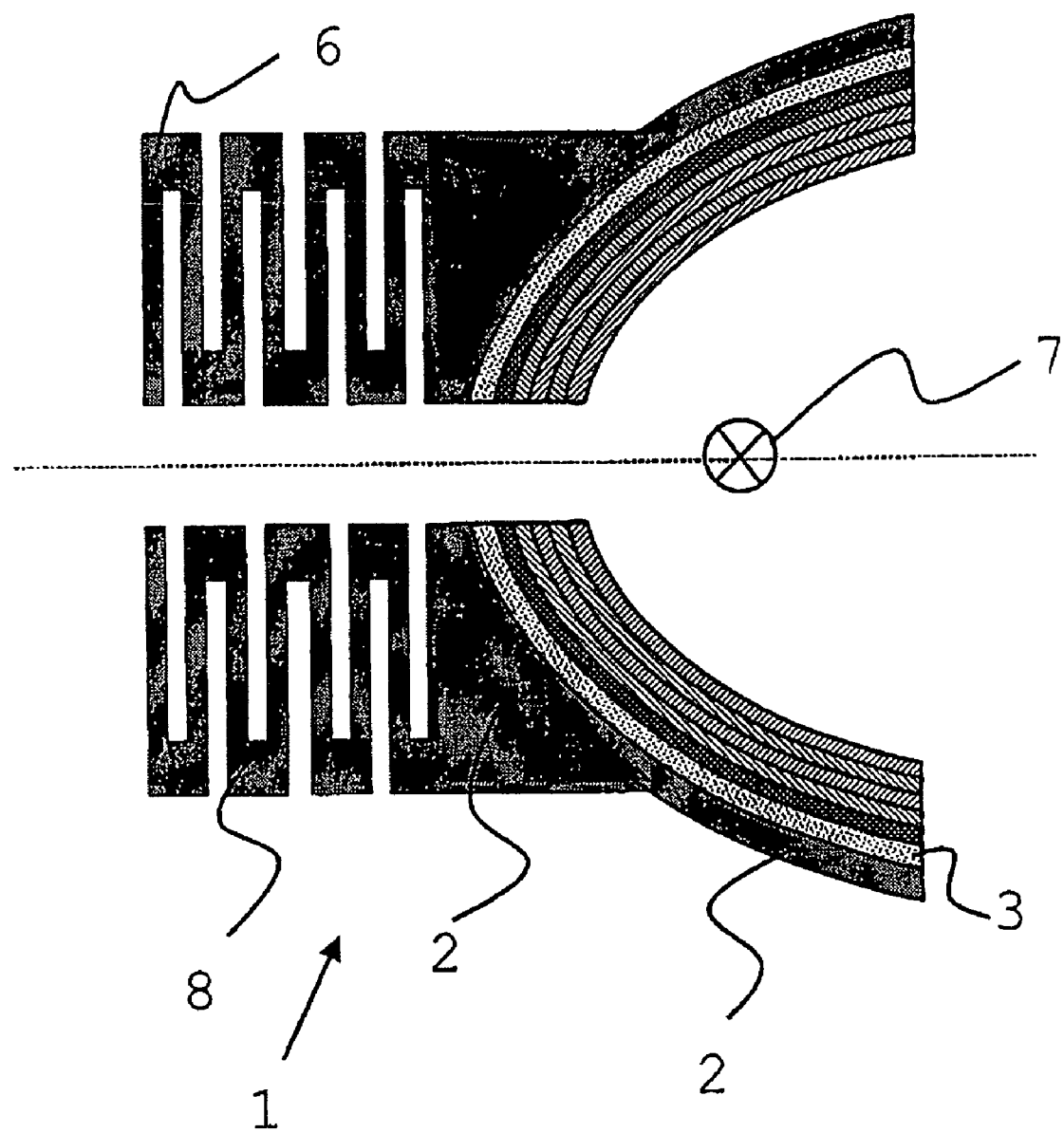
FIG. 3 shows a diagrammatic view of a reflector according to the invention comprising cooling ribs.

FIG. 3 likewise shows a diagrammatic example of a reflector 1 according to the invention. This reflector 1 is likewise produced from a solid metal block by a chip-forming process. The reflector is in the form of a single piece. On its rear side, the metal substrate 2 has meandering cooling ribs 8, and on its front side it is likewise provided with a reflection layer 3 and an infrared-absorbing cold-light mirror coating based on the example of the embodiment shown in FIG. 1c.

Figure 4:
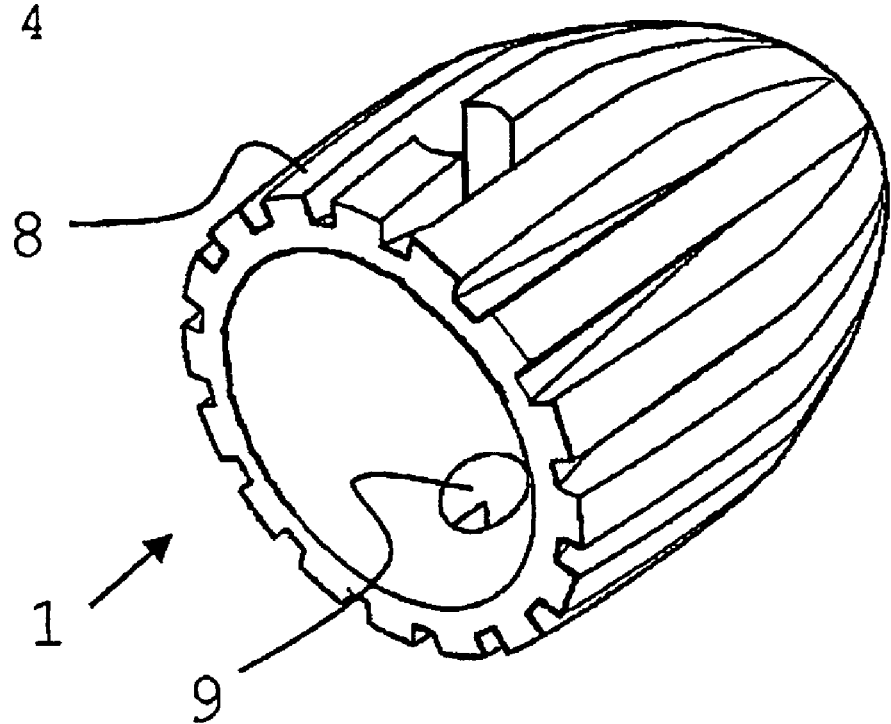
FIG. 4 shows a diagrammatic view of a reflector according to the invention with cooling ribs.

FIG. 4 shows a further exemplary embodiment of a reflector according to the invention, in a diagrammatic perspective view. The reflector 1 has cooling ribs 8 and a cutout 9 in the form of a bore in the side wall, allowing the introduction of a luminous means (not shown).

Figure 5:
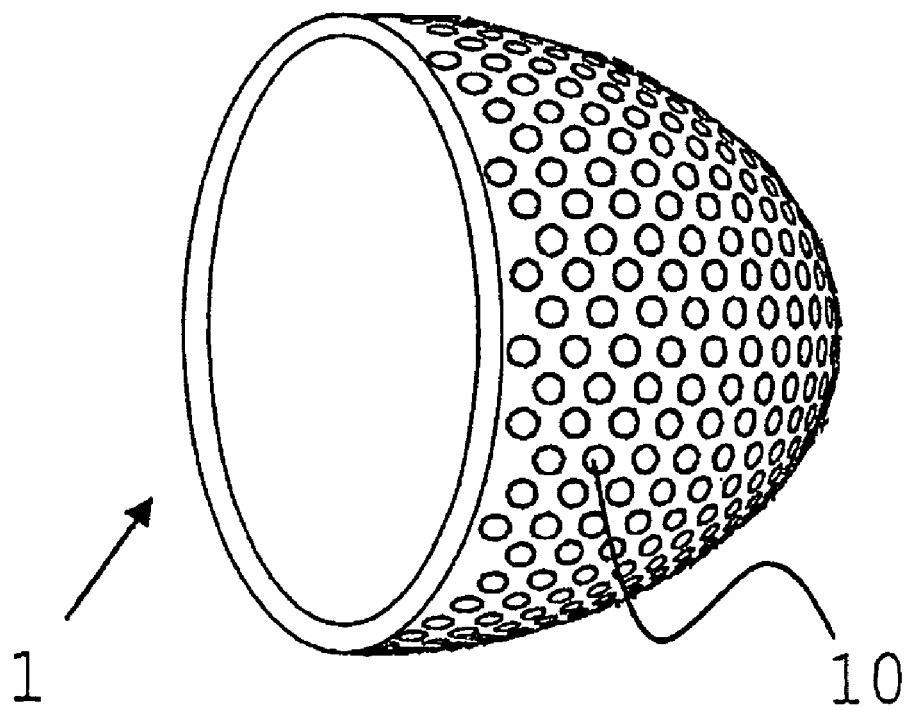
FIG. 5 shows a diagrammatic perspective view of a reflector according to the invention with crater-shaped indentations.

FIG. 5 shows a further embodiment of a reflector according to the invention. This reflector 1 has a structure in the form of crater-like indentations 10, also known as dimples, on the rear side. Given suitable boundary conditions, these dimples lead to the generation of turbulence in the cooling fluid flowing past. In this way, the dissipation of heat from the reflector can be considerably improved.

Figure 6:
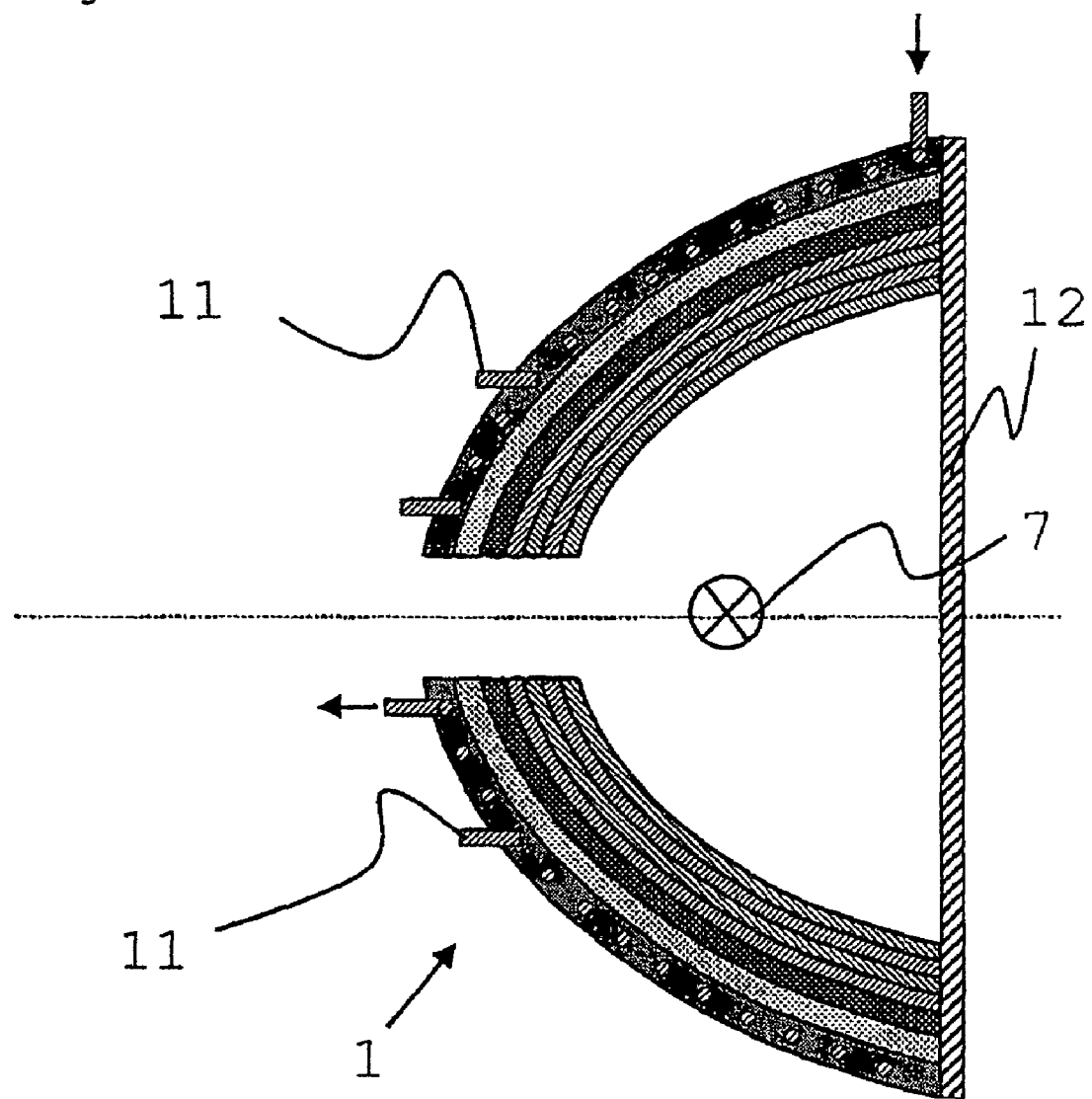
FIG. 6 shows a further diagrammatic sectional view of a reflector according to the invention comprising centering means and a reflecting protective plate.

FIG. 6 shows a further diagrammatic sectional view of a reflector 1 according to the invention. As locating means, this reflector has locating pins 11, by means of which the reflector can be fitted in a defined position in a holder (not shown). In addition, an infrared-absorbing plate 12 is arranged on the front side, so that only a small quantity of infrared radiation escapes to the outside.

Figure 7:
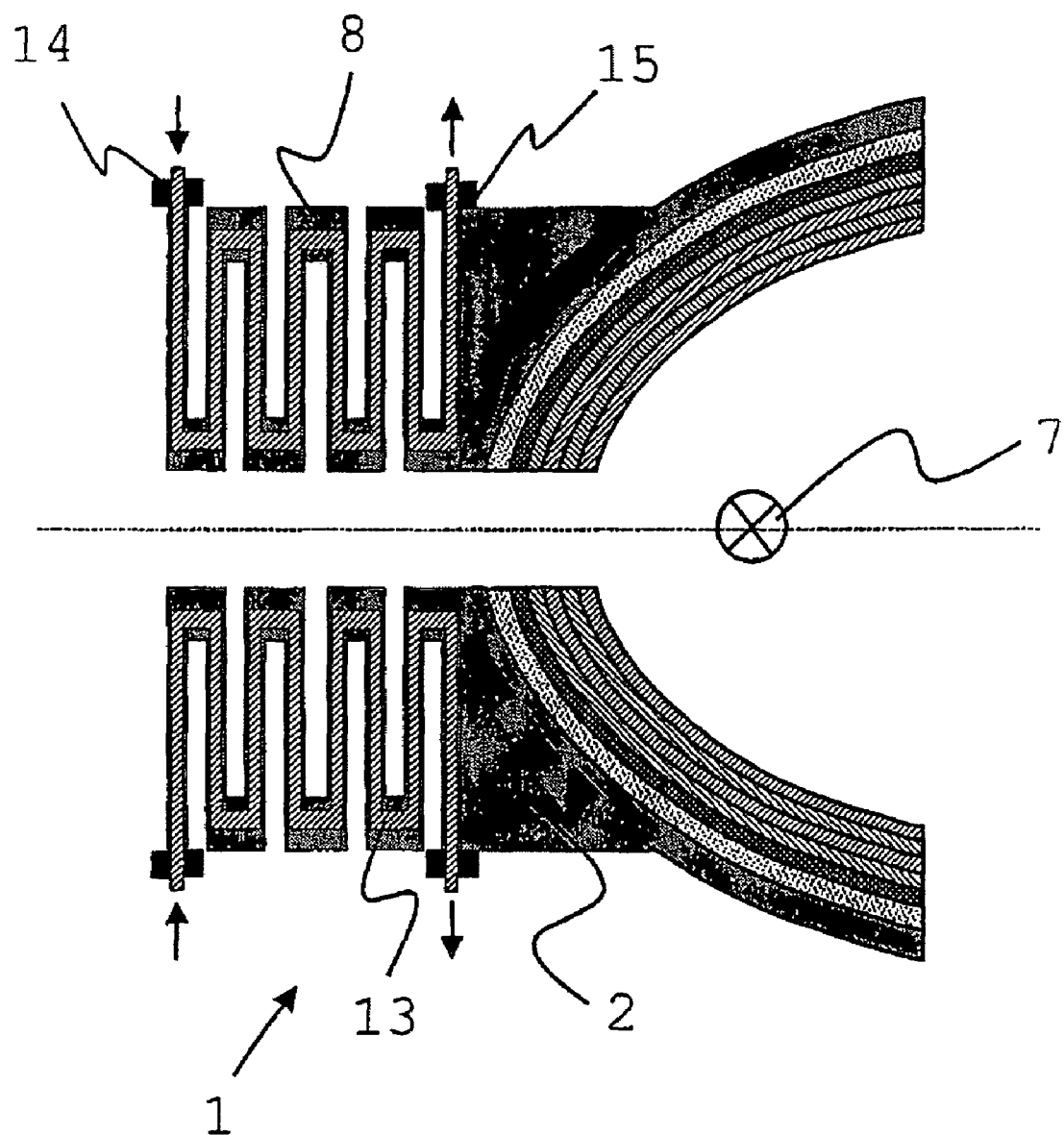
FIG. 7 shows a diagrammatic view of a reflector according to the inventing comprising an external coolant feed.

FIG. 7 shows a further diagrammatic sectional view of an exemplary embodiment of a reflector 1 according to the invention. This reflector too comprises a metal substrate 2. The reflector has meandering cooling ribs 8 in which cooling passages 13 are recessed. The cooling passages can be connected at the inlet 14 and outlet 15 to an external cooling circuit (not shown).

Figure 8:
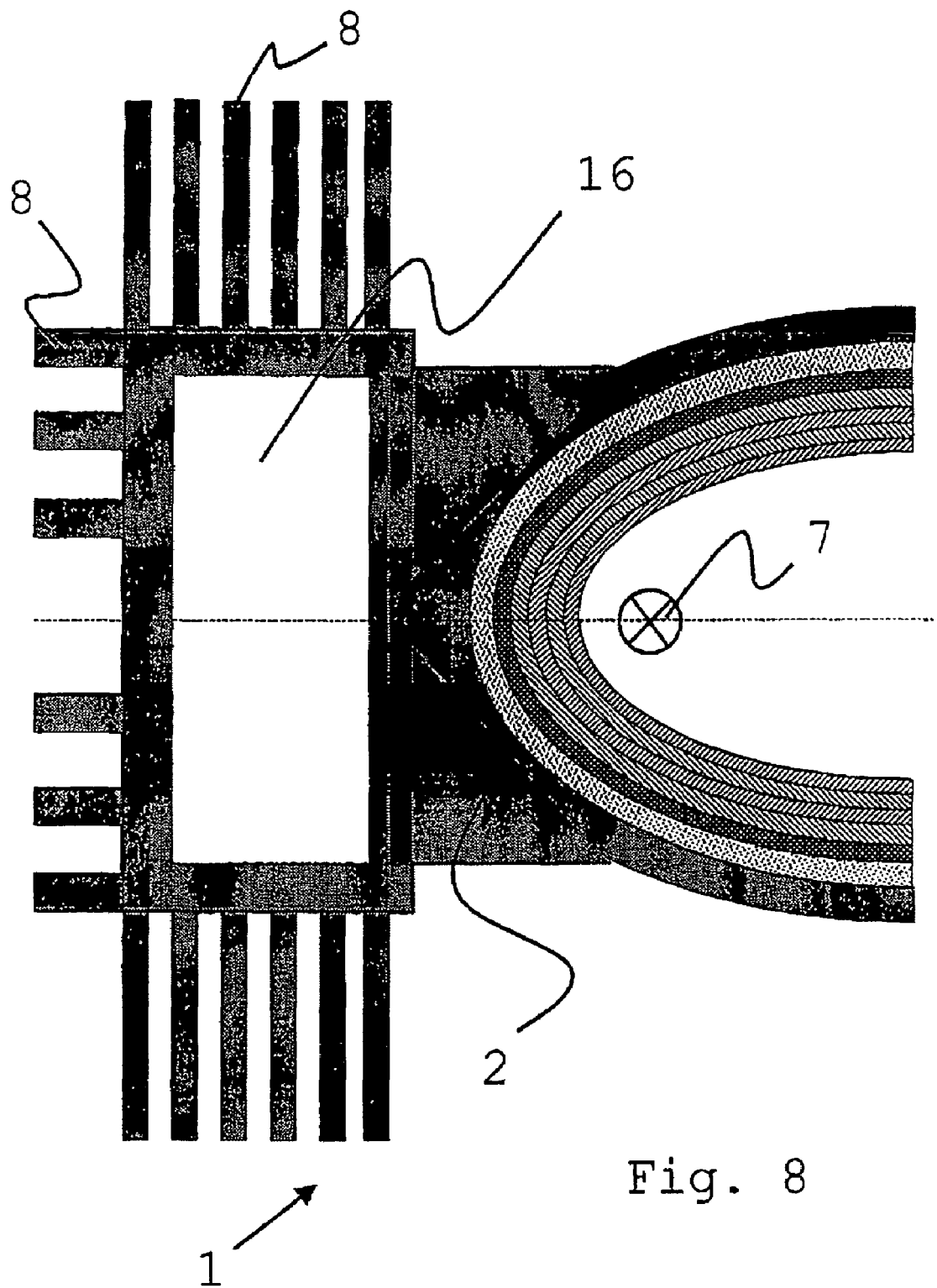
FIG. 8 shows a further diagrammatic sectional view of a reflector according to the invention comprising a base body equipped with a cavity for a cooling fluid and cooling ribs.

FIG. 8 shows a further advantageous embodiment of a reflector according to the invention. The reflector 1 comprises a metal base body composed of a metal substrate 2 which has cooling ribs 8 at the edge sides. On the rear side, the reflector 1 also has a cavity 16, which is filled with coolant, which further improves the cooling in the cavity through convection. It is thus possible to dispense with forced circulation of air by means of, for example, electrically operated fans even in the case of a reflector 1 which comprises a light source 7 in the form of a high-power luminous means.

Figure 9:
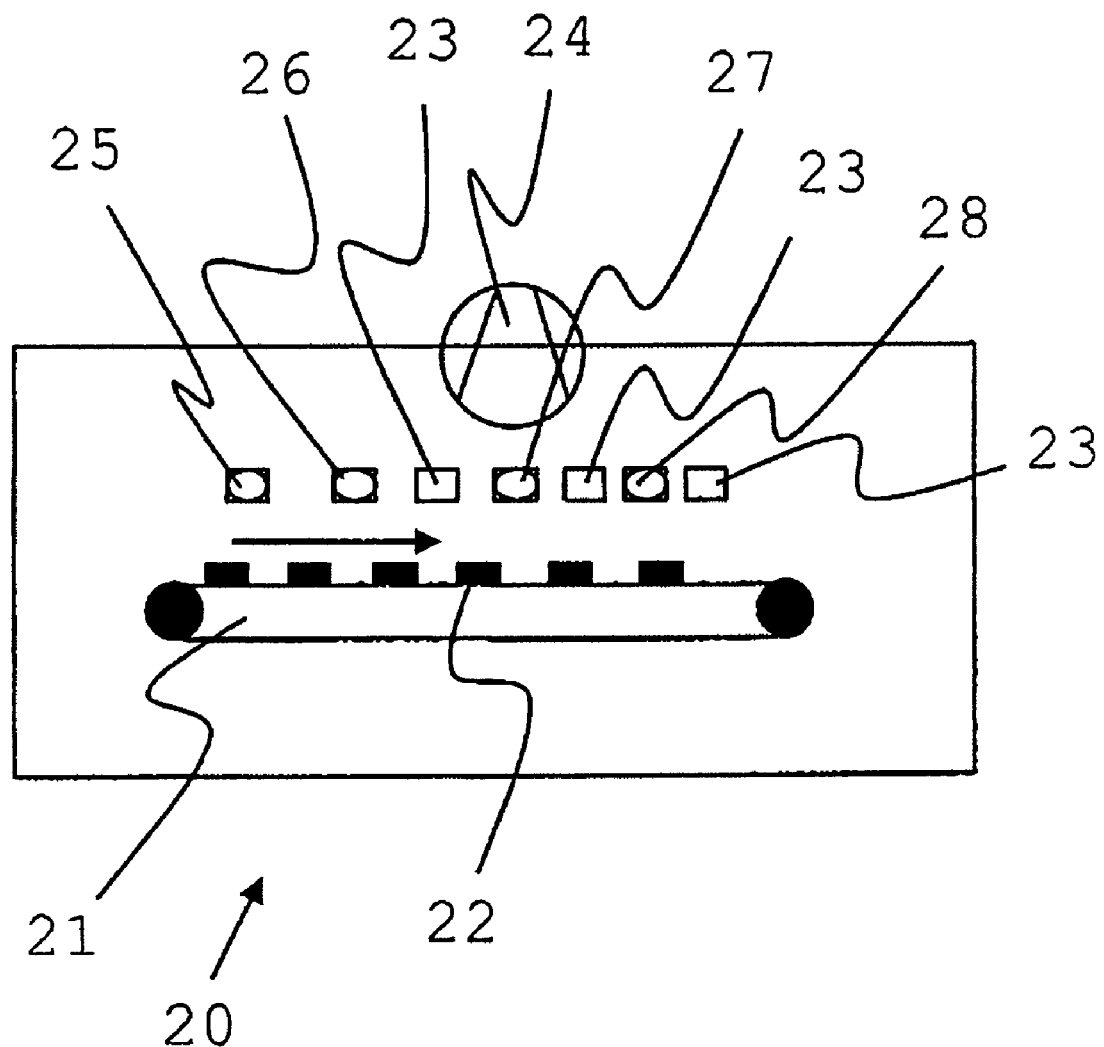
FIG. 9 shows a coating installation intended for coating the reflectors according to the invention.

FIG. 9 shows a diagrammatic embodiment of a coating installation 20 for the coating process according to the invention. The coating installation 20 comprises a conveyor belt 21 on which the reflector substrates 22 are arranged. The running direction of the conveyor belt is marked by an arrow. First of all, a reflecting silver or aluminum layer can be applied by means of a sputtering process using a silver or aluminum target 25. Then, a chromium layer can be applied by sputtering using a chromium target 26. Then, the substrate moves past silicon targets 27 and titanium targets 28. By means of oxygen plasma sources 23 arranged between them, it is possible to produce a chromium oxide layer from the chromium layer and to apply an alternating titanium oxide and silicon oxide layer system. The installation is evacuated by means of at least one vacuum pump 24.

Figure 10:
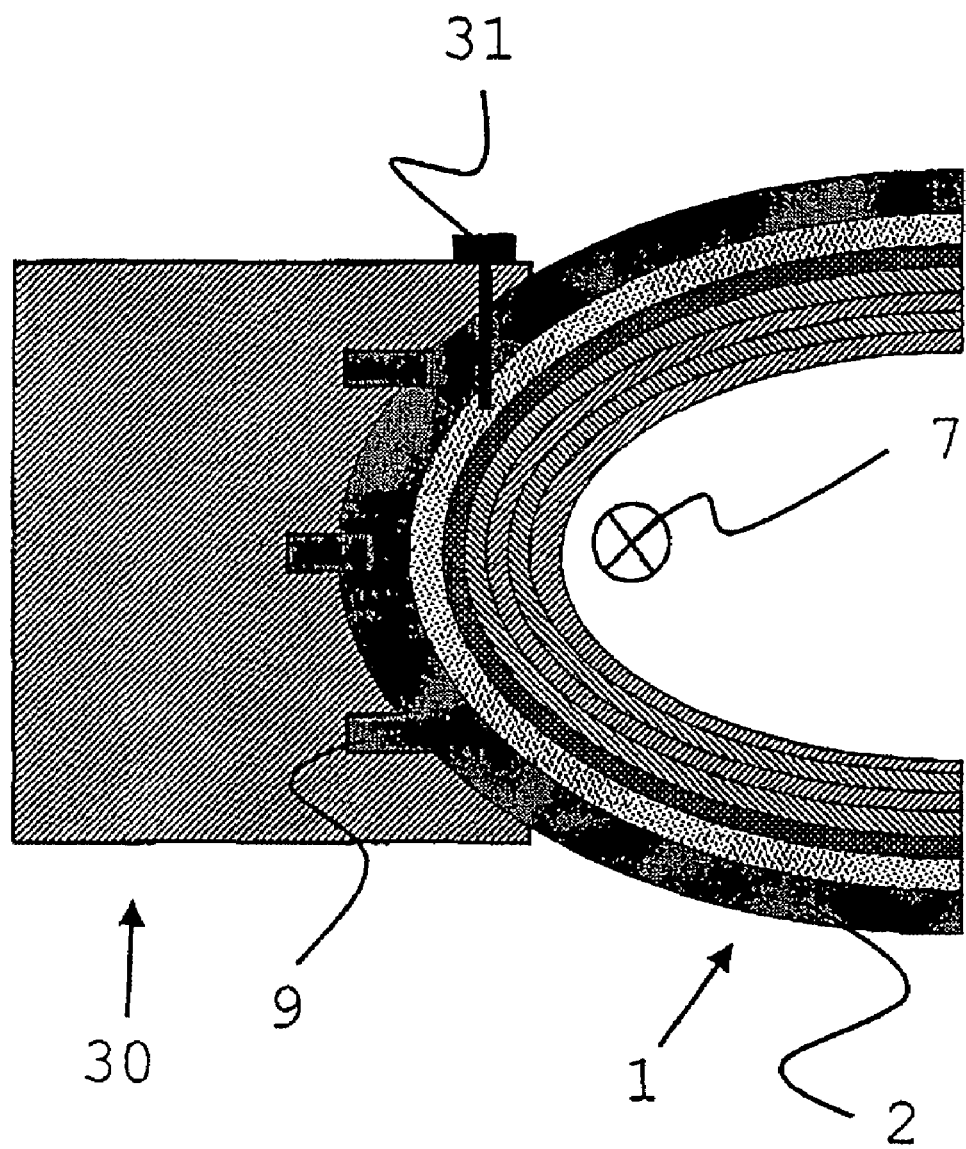
FIG. 10 shows a diagrammatic view of a projection system according to the invention.

FIG. 10 shows a diagrammatic view of a projection system according to the invention. The reflector has locating means in the form of locating pins 11 which are part of the metal base body 2. A light source 7 in the form of a high-power lighting lamp is arranged in the reflector 1. The locating pins 11 allow the reflector 1 to be fitted in a defined position in a holder 30. Then, the reflector 1 is secured so that it cannot drop out by means of a screw 31 which can be screwed through the holder 30.

Figure 11:
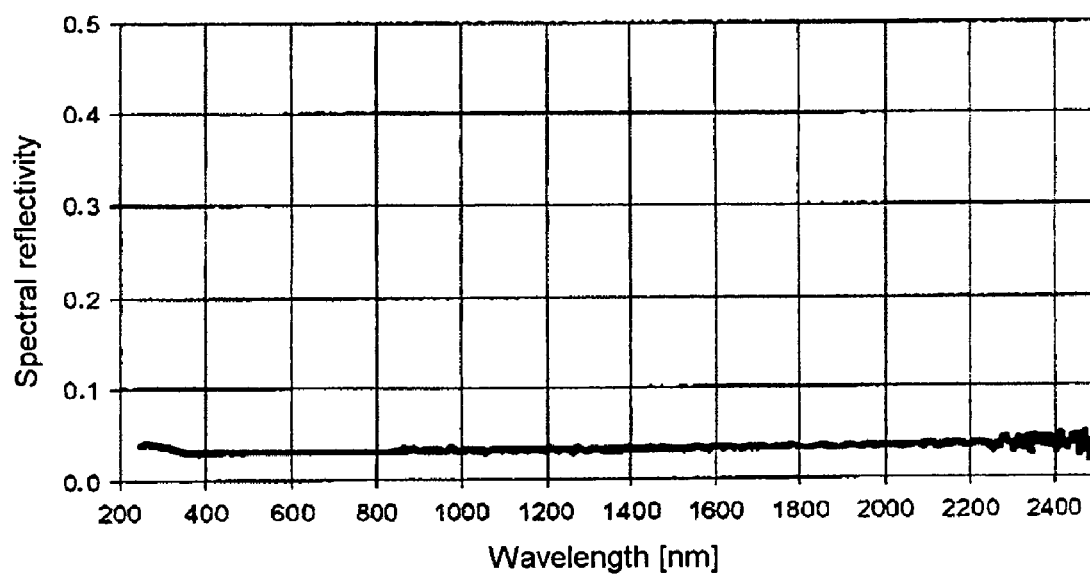
FIGS. 11 to 13 show spectral curves of the reflectivity of black layers as can be used as infrared-absorbing layers for cold-light reflector coatings for reflectors according to the invention.
Figure 12:
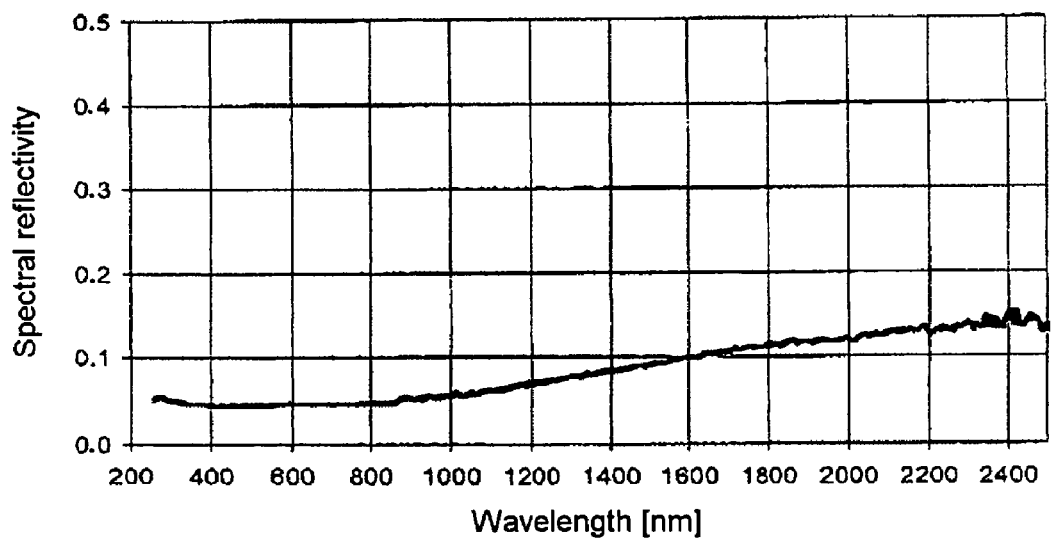
Figure 13:
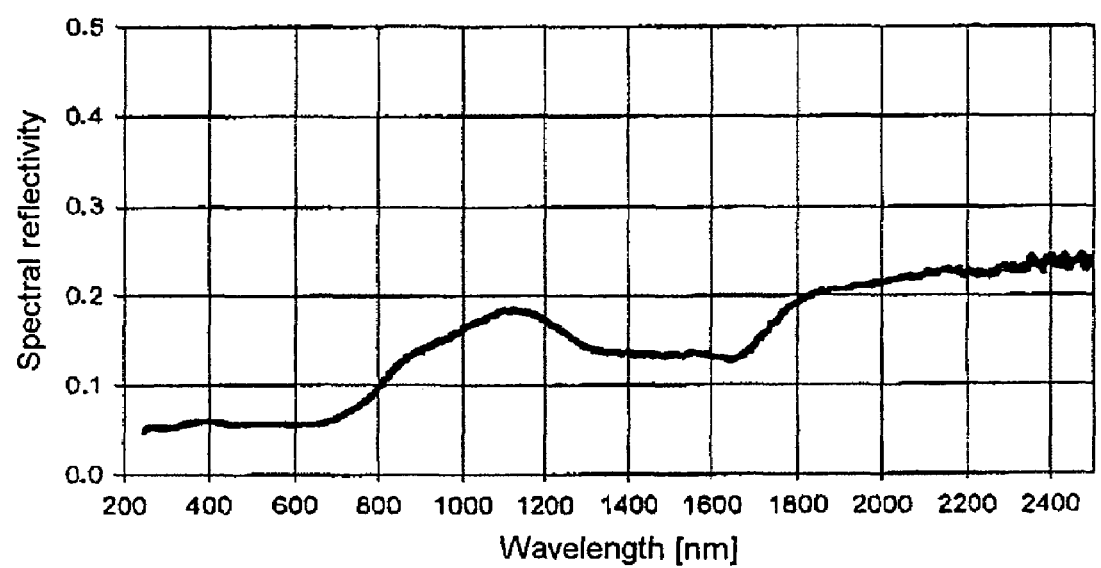

FIGS. 11 to 13 show the spectral absorption properties of various exemplary embodiments of infrared-absorbing layers which can be used, for example, as black layer 33 for a reflector as shown in FIG. 1g or in addition or as an alternative to an absorbing chromium oxide layer 5 as is present in the exemplary embodiments shown in FIGS. 1c to 1f or FIG. 2. In this context, FIG. 11 shows the spectral reflection of a black chrome layer. A layer of this type is preferably deposited on the metallic reflector body by electroplating. It can be seen from FIG. 11 that a layer of this type has very good absorption properties over a wide wavelength range. For example, the spectral absorption is approx. 95% of the radiation introduced in a range from less than 300 nm to over 2400 nm.

FIG. 12 illustrates the absorption properties of a black anodized layer as the black layer. The absorption is in this case particularly high in the visible spectral region, then the reflectivity increases slowly in the infrared. Overall, it can be seen that with a black anodized layer, approx. 85% to 95% of the radiation introduced in the wavelength range from 400 nanometers to 2400 nanometers is absorbed.

Finally, FIG. 13 shows the spectral reflectivity of a black layer in the form of an absorbing enamel layer. The absorption properties are slightly worse than those of black anodized or black chrome layers, but in this case too an absorption of on average at least 75% is achieved in the visible and in particular also the infrared region. The spectral absorption even remains over 75% from the ultraviolet region to the infrared at 2400 nanometers, in particular over approx. 80% in a range up to a wavelength of 1800 nanometers. Moreover, the enamel layer has very good bonding to the metal substrate and a very good ability to withstand temperature changes.

LIST OF DESIGNATIONS

1 Reflector
2 Metal substrate
3 Reflection layer
4 Alternating layer
5 Chromium oxide layer
6 Protective layer
7 Light source
8 Cooling ribs
9 Cutout
10 Indentation
11 Locating pin
12 Plate
13 Cooling passage
14 Inlet
15 Outlet
16 Cavity
20 Coating installation
21 Conveyor belt
22 Substrate
23 Oxygen source
24 Vacuum pump
25 Al or Ag target
26 Cr target
27 Si target
28 Ti target
30 Holder
31 Screw
33 Black layer

The invention claimed is:

1. A reflector comprising:
a metal substrate;
at least one coating on the metal substrate deposited by a PVD process or a CVD process; and
at least one cavity that is at least partially filled with a coolant, wherein the coolant has a phase transition at approximately an operating temperature,
wherein the metal substrate and the at least one coating have a reflecting inner side and an outer side.

2. The reflector as claimed in claim 1, further comprising a plurality of cooling ribs at least on the outer side.

3. The reflector as claimed in claim 1, further comprising a plurality of cooling passages.

4. The reflector as claimed in claim 1, further comprising at least one flange for connection of the metal substrate to an external coolant circuit.

5. The reflector as claimed in claim 1, further comprising a locating means.

6. The reflector as claimed in claim 1, further comprising a coating that absorbs infrared radiation at least on the reflecting inner side.

7. The reflector as claimed in claim 1, further comprising a black layer at least on the reflecting inner side.

8. The reflector as claimed in claim 7, wherein the black layer has an absorption of at least 80% in a visible and an infrared region up to a wavelength of 1800 nanometers.

9. The reflector as claimed in claim 1, wherein the reflecting inner side has a surface with a roughness average of less than 200 nanometers.

10. The reflector as claimed in claim 1, wherein the reflecting inner side has a tolerance zone range of less than 200 micrometers.

11. The reflector as claimed in claim 1, wherein the reflecting inner side has a material thickness of over 0.3 millimeters.

12. The reflector as claimed in claim 1, wherein the metal substrate and the at least one coating is in the form of a single piece.

13. The reflector as claimed in claim 1, wherein the outer side has a plurality of indentations each with a cross section substantially in a shape of a crater.

* * * * *